June 16, 1964  R. O. GORDON  3,137,238
PUMP OR MOTOR

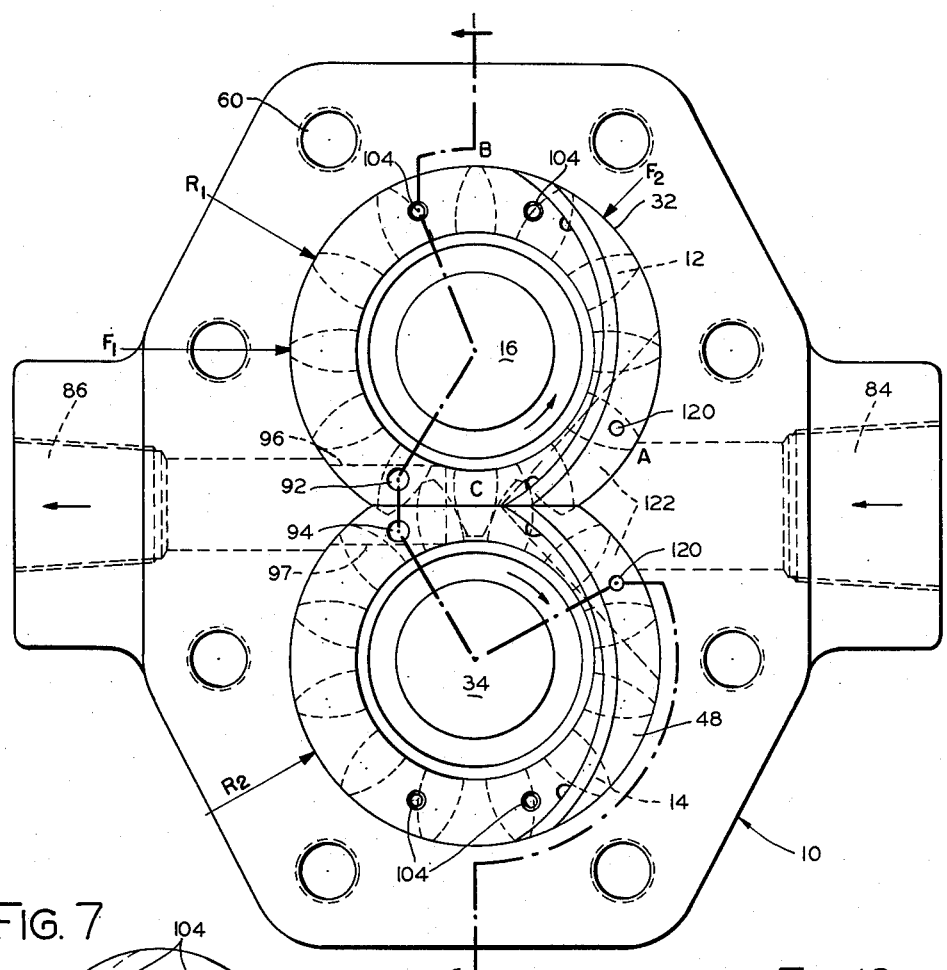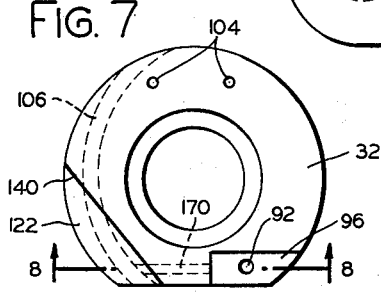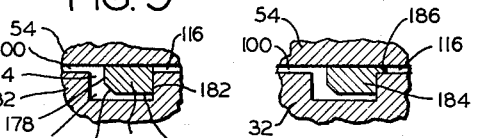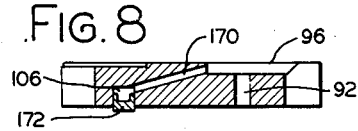

Filed Dec. 11, 1961  4 Sheets-Sheet 3

INVENTOR
RICHARD O. GORDON
BY J. C. Wiessler
ATTORNEY

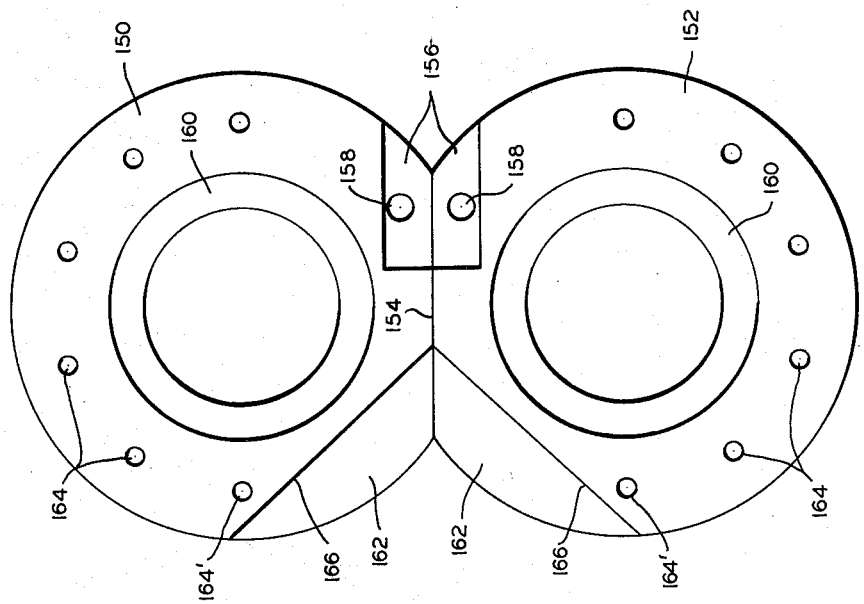
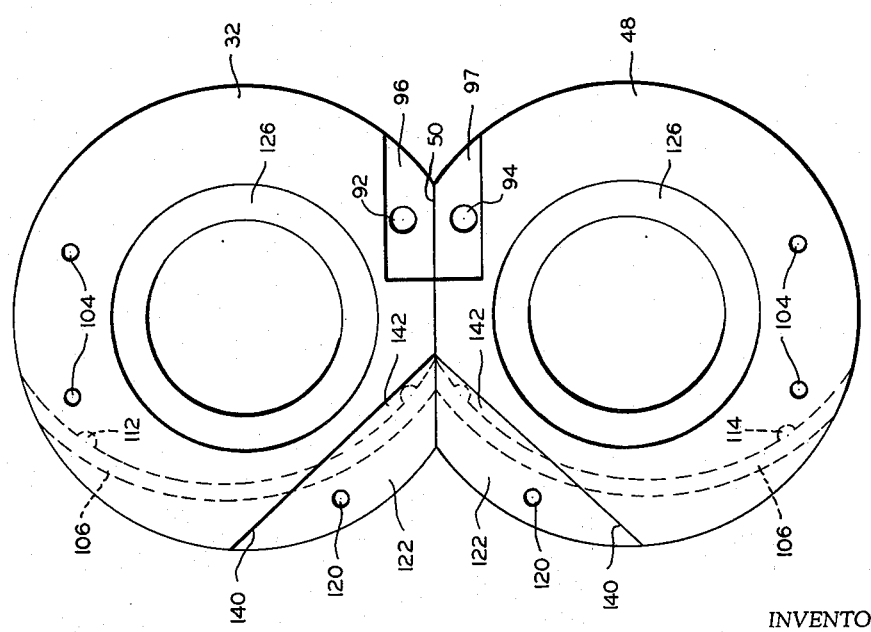

United States Patent Office 3,137,238
Patented June 16, 1964

3,137,238
PUMP OR MOTOR
Richard O. Gordon, New Buffalo, Mich., assignor to Clark Equipment Company, a corporation of Michigan
Filed Dec. 11, 1961, Ser. No. 158,362
33 Claims. (Cl. 103—126)

This invention relates to fluid displacement pumps and motors, and more particularly to pressure loaded pumps and motors.

It has long been a problem in the art to which this invention pertains to design a pressure loaded gear pump, for example, capable of generating relatively high discharge pressures in the order of 2,000 p.s.i. and above, which is operable at high mechanical and volumetric efficiencies, and capable of high performance operation for relatively long periods of time with minimum maintenance requirements. A major problem to which no completely satisfactory solution has previously been found results from the pressure gradient encountered in operation of such pumps which tends to cause the pump and the pump pressure sealing means to operate in an unbalanced condition with resulting short pump life, high maintenance cost and reduced efficiency. Many attempts to solve what may be termed the "pressure gradient problem" have been made with varying degrees of success. A number of these prior partial solutions are summarized in U.S. Patent No. 3,057,303, issued in the name of John A. Lauck (common assignee). Other approaches to a solution of this problem are disclosed in U.S. Patents Nos. 2,809,592, issued in the names of Miller et al., and 2,853,952, issued in the name of Aspelin.

My invention takes into account aspects of the pressure gradient problem not previously recognized or appreciated in the art with the result that the pump sealing pressure or thrust plate is properly balanced under all operating conditions of the pump. I have found that in the operation of gear pumps the pressure gradient characteristic may and does vary widely under different conditions of pump operation. Ordinarily in gear pumps of the type contemplated and for which this invention is well-suited, the motive surfaces of the pump thrust plates are subjected to discharge pressure more or less uniformly throughout the area thereof, while the forward sealing or gear side engaging surfaces thereof are subjected to the pressure gradient which extends from the inlet pressure in the area adjacent the pump inlet to the discharge pressure in the area adjacent the discharge side of the pump. The resulting unbalanced pressure condition to which each thrust plate is subjected tends to twist the thrust plate and results in uneven wear, thereby increasing the power required to turn the pump and greatly shortening the life of the pump; wear is concentrated, of course, on the inlet side of the pump.

It has been usually assumed heretofore that the pressure gradient condition to which the forward surface of the thrust plate is subjected remains essentially the same during pump operation. However, I have found that when such gear pumps are operated on solid oil at low speed there is essentially no pressure gradient, except to the extent that the forward surface of the thrust plate near the inlet will be subject to pump inlet pressure while the rest of the forward surface is subjected to discharge pressure. More specifically, the pressure in the gear teeth pockets under the thrust plate is approximately equal to outlet pressure as the teeth revolve from the inlet area around to the outlet area. Oil at outlet pressure leaks past each tooth through the clearance between the tips of the teeth and the bore of the body back to within one or two teeth of the inlet when the pump is running at low speed. Therefore, the pressure on top of the plate and the pressure between the teeth on the underside of the plate are approximately the same, and there is no pressure gradient at low pump r.p.m. except to the extent indicated above. The force pushing the pressure plate against the gear is a result of the pressure on top of the plate over the area of the plate open to high pressure. The force tending to push the plate away from the gear is the pressure between the teeth from the inlet around to the outlet times the area of the plate open to this pressure.

A pressure gradient begins to become apparent as the pump speed increases with the pump operating on solid oil. The reason for this is that the oil or other fluid cannot cascade back across each tooth through the clearance between the tips of the teeth and the body of the pump as the speed of the gears increase. The characteristic gradient with increasing pump speed may vary from one pump to another of the same design depending upon the specific mechanical construction of one pump compared to another. For instance, if as a result of manufacturing tolerances in the construction of such pumps, the gear teeth of one pump rub against the pump body the pressure will be substantially lower adjacent the inlet than in the case of a similar pump having gears which clear the body by several thousandths of an inch. Again, if a gear pump cavitates by reason of a restriction at the inlet or insfficient fliud to fill all of the teeth, a situation which frequently occurs in cold weather starts, then there will be no substantial pressure between the teeth until they reach a position near the outlet of the pump. A similar situation occurs if the pump sucks air or oil with a large quantity of air entrained in it. When the pump is running under cavitation conditions or on air, the outlet pressure applied to the top of the thrust plate forces the thrust plate against the gear with the same force that was pushing the plate against the gear when the pump was running on solid oil. However, because there is air and insufficient oil in the teeth starting at the inlet there is no substantial pressure pushing the plate upward away from the gear. Therefore, the force holding the plate against the gear of a pump which was designed for operation on solid oil, is too great under cavitation or air pumping conditions and thus forces the thrust plate against the gear with too great a thrust causing the plate to destroy the lubricating oil film between the plate and the gear. The pressure plate then overheats and begins to disintegrate at the rubbing surfaces.

As a result of extensive tests I have found that in any given gear pump design the pressure gradient characteristic under different conditions of operation will vary widely, depending upon such things as variations in viscosity of the fluid, whether air is entrained in the fluid, pump speed and the level of discharge pressure. If, therefore, a pump design takes into account only one condition of pump operation, such as operation of the pump on solid oil at a particular speed, the pump in operation will be subjected to various degrees of unbalance as operating conditions vary from the assumed design condition. As a practical matter, it is extremely difficult, if not impossible, to predict with accuracy the precise pressure gradient condition which will exist under various conditions of operation. I have devised means which inherently and automatically senses the existing pressure gradient in the pump regardless of operating conditions, and is able to effect a balanced thrust plate under all conditions of pump operation with the consequent elimination of disadvantages heretofore experienced in operating unbalanced pumps.

In carrying out my invention in a preferred embodiment thereof I have provided an arcuate groove in the motive surface of the thrust plate adapted to receive a spring and pressure loaded arcuate metallic ring which at least partially seals off discharge pressure fluid from the portion of the plate adjacent the inlet side of the pump on the one side of the sealing member. An opening is provided in the plate on said one side of the sealing member which drains leakage fluid to inlet pressure. By this means, a portion of the thrust plate which is continuously subjected to inlet pressure on the sealing side thereof is subjected to a relatively low pressure on the motive surface side of the plate. One or more pressure gradient openings are provided in the plate in circumferentially spaced relation and radially outwardly of the root diameter of the gear teeth, and these gradient openings receive pressure fluid in the pressure chamber on the motive surface side of the plate from an opening which is preferably larger in diameter and is located in the discharge section of the pump.

In another embodiment of the invention, the arcuate sealing member is not present and the motive surface of the pump is essentially a smooth surface. In the latter embodiment, a series of such gradient holes are provided in the thrust plate starting near the inlet of the pump and placed at regular intervals circumferentially to a location near the outlet while a larger diameter opening is provided at the outlet for supplying discharge pressure fluid to the motive surface side of the plate.

The pressure gradient openings in both embodiments compensate for a change in pressure gradient on the sealing side of the plate in the following manner: When the pump is running on solid oil at low speed the pressure on top of the plate and the pressure between the teeth are essentially equal. When a pressure gradient condition develops between the teeth for any reason, such as discussed above, the pressure between the teeth changes from the inlet around to the outlet. As pressure under any of the gradient openings in the thrust plate drops below the outlet pressure of the pump, oil begins to flow from the top of the plate down through the gradient openings into the pockets between the teeth passing the gradient openings. The lower the pressure between the teeth below the gradient openings, the more oil will flow through such openings. The pressure on top of the plate is therefore reduced below outlet pressure by the amount of oil flowing through the gradient openings. The pressure on top of the plate is reduced in proportion to the change in pressure gradient from inlet to outlet. The lower the pressure between the teeth, therefore, the less will be the pressure acting in any particular area of the plate to force the plate against the gear. The size and number of the gradient openings in relation to the size of the opening admitting outlet pressure to the top of the plate will control the pressure gradient on top of the plate when the pump is running under conditions which cause a pressure gradient on the gear side of the plate.

It is therefore a primary object of the present invention to provide a vastly improved pump or motor construction which continuously compensates for varying pressure gradient conditions in the unit during operation of the pump or motor.

It is another important object of the invention to provide in the thrust plate of a gear pump or motor a plurality of circumferentially spaced pressure gradient openings which are located radially outwardly of the root diameter of the gear teeth and which receive pressure fluid from the discharge side of the pump.

A further important object of the invention is to provide in a pump or motor of the type contemplated a thrust plate construction wherein means is provided for at least partially sealing off one portion of the thrust plate from the remaining portion thereof, and means in said remaining portion for compensating unbalanced force conditions which are generated during operation.

A further object of the invention is to provide a pressure gradient compensating construction in pumps and motors of the types contemplated wherein the unit during operation tends to remain in pressure balance irrespective of varying pressure gradient conditions as between upper and lower portions of the unit when the unit is mounted for operation, for example, in an upright position.

An additional object of the present invention is to provide a generally improved pump or motor which is of relatively simple construction and which compensates for variable unbalancing forces generated during operation.

It is a primary object of the invention to provide in fluid pumps and motors of certain types a construction which inherently and automatically compensates for changes in pressure gradient which may result from such things as the passage of air in the unit, cavitation, changes in unit speed and discharge or inlet pressure conditions, viscosity of the fluid, and the like.

As will be apparent from the foregoing, one of the primary advantages of the present invention inheres in the concept of dynamic pressure gradient compensation, as distinguished from prior attempts to solve the pressure gradient problem by means of static pressure control of thrust plate operation. This dynamic control has a number of functional advantages, some of which have been pointed out above. Another concerns automatic compensation for temperature changes in the oil being pumped. The pressure gradient in pumps of the types contemplated varies as a function of changes in temperature. As the temperature increases to, say 250° F., the oil becomes correspondingly thin. As the oil thins out with increasing temperature and under pressure gradient conditions in the pump gears, the pressure gradient openings provided in the thrust plate of my construction automatically compensate for the less viscous oil, which has less lubricative quality, in that a proportionately greater volume of oil will flow to the gear pockets from the motive pressure chamber than in the case of oil of high viscosity. In other words, in my pump, as the temperature increases motive chamber pressure decreases correspondingly under given pressure gradient conditions in the pump. This automatic compensation feature is important to longevity of the pump. It insures that, other factors being equal, the thrust plate will not only seal the side face of the gear in a balanced condition, but will seal with a force which is not excessive under any assumed pump operating condition. As discussed above, excessive sealing pressure reduces longevity of the pump by producing excessive wear between the gear and thrust plate. This additional functional advantage is not present in the prior art wherein each static pressure chamber of the thrust plate is sealed off from the other compartments, so that the viscosity of the oil has no relationship to the pressure which is applied in each thrust plate compartment inasmuch as there is no over-all dynamic flow pattern as exists in the present invention which utilizes an uninterrupted motive pressure chamber.

Still another object of the invention is to provide in intermeshing gear pumps improved means for minimizing the forces which act in directions radial of the pump gears and on the pump shaft bearings under various conditions of pump operation.

Gear pumps have heretofore been of relatively limited utility and longevity partly as a result of inherently high bearing loads resulting from unbalanced radially directed forces encountered in operation, particularly during conditions producing a relatively high or abnormal pressure gradient in the pump. My relatively simple means for effecting pressure gradient compensation in respect of balanced thrust plate operation also results inherently in a compensating fluid pressure force on the inlet side of the pump which tends to counteract high radial pressure forces on the discharge side of the pump, whereby to limit within acceptable values the load on the shaft bearings which may be encountered under any pump operating condition.

Another object of the invention is to provide an improved inlet mask-off construction for use with thrust plates in pumps and motors of the types contemplated.

A further important aspect of the present invention relates to the relatively low cost of construction for providing accurate pressure gradient compensation. The present invention does not necessitate, as heretofore, provision in the thrust or motive pressure chamber of resilient seals, and corresponding grooves, to provide individual pressure compartments. The prior art constructions are, therefore, far more costly to produce, and substantially less desirable from the stand point of serviceability and end function than is the present construction.

It is therefore another object of the invention to provide an improved construction in pumps and motors of the types contemplated which is substantially less costly to manufacture, and to service and repair than heretofore.

Another important aspect of the present invention provides an angular milled-out section or recess adjacent the inlet side of the pump and in the face of the sealing side of the thrust plate. The use of such milled-out recesses effects a number of advantages in the operation of gear pumps and the like. The removal of sealing surface area in the inlet section of the pump eliminates the possibility of burning and disintegration of the thrust plates in this area which, in the preferred embodiment of the invention, lies primarily beneath the masked-off section on the top side of the thrust plate. Also, the milled-out recesses are arranged on the plates to replace the inlet trapping grooves which are normally formed in such thrust plates. In my invention, the milled-out recess on the inlet side of each thrust plate extends slightly beyond the arcuate sealing rings on the opposite side of the plate so that a portion of the milled-out area is under the high pressure area on top of the plate. This leaves an area adjacent the inlet which supports a section of the top of the plate as a cantilever beam. Outlet pressure is applied to this small unsupported area and the resulting downward force has a tendency to tilt the pressure plate and lift it off the gear. The edge of the milled-out portion functions as a fulcrum. The recess, the fulcrum edge and the unsupported area of the plate subjected to high pressure on top of the plate are arranged to permit the plate to be properly held against the gear when the pump is running with a normal pressure gradient. However, when the pump cavitates or pumps an excess of air, for example, the pressure gradient control, discussed above, reduces the pressure on top of the plate and the plate tilts away from the gear side face about the fulcrum edge of the recess. The pump will continue to pump at the pressure at which the plate tilts, but will not exceed such pressure, although it is capable of pumping at any pressure below said controlled maximum, and will pump normally on solid oil or if the cavitation or air condition at the inlet to the pump is alleviated. For example, I have tested a sixty-five gallon per minute pump utilizing a milled-out thrust plate as discussed above with pressure gradient openings; the pump ran at 2500 p.s.i. discharge pressure on solid oil with zero p.s.i. inlet pressure. The pressure plate would tilt and the pump could not be run above 1500 p.s.i. when approximately thirty percent air by volume was introduced at the inlet. The pressure gradient holes reduced the pressure on top of the plates which permitted the plates to tilt as aforesaid. The sixty-five gallon per minute pump was run on solid oil and pumped 2000 p.s.i. at 2000 r.p.m. with the inlet restricted to fifteen inches of mercury. Any inlet restriction higher than fifteen inches of mercury caused cavitation, under which condition the pressure gradient holes reduced the pressure on top of the plate sufficiently to permit the plate to tilt about the fulcrum edge of the recess and unload the pump. The pump returned to normal operation by decreasing the inlet restriction to less than fifteen inches of mercury.

The milled-out area of the plate can also be designed so that the pressure plate will tilt at a predetermined pressure with the pump running on solid oil. In other words, the pressure plate can be constructed to function also as a built-in relief valve.

It is therefore an additional important object of the present invention to provide a thrust plate construction in pumps and motors of certain types which is capable of responding as a valve under certain conditions of operation.

Another object of the invention is to provide in pumps and motors of the types contemplated a thrust plate construction which under certain conditions tends to tilt to unload the unit.

Other objects and advantages of the present invention will become apparent from the following detailed description of an exemplary application and embodiments thereof taken in conjunction with the drawings wherein:

FIGURE 2 is an elevational view of the pump taken from the left end of FIG. 1 with the cover body removed;

FIGURE 4 is an elevational view of the thrust plate construction shown in FIG. 3 but taken from the sealing or opposite side thereof;

FIGURE 6 is a view similar to FIG. 4 but showing the opposite side of the modified thrust plate construction of FIG. 5;

FIGURE 7 illustrates a modification of the thrust plate and sealing member construction shown in FIGS. 3 and 4;

FIGURE 8 is a sectional view taken along line 8—8 of FIG. 7;

FIGURE 9 is an enlarged broken away sectional view showing another modification of the sealing element of FIG. 3; and FIGURE 10 is an enlarged broken away sectional view showing yet another modification of the sealing element of FIG. 3.

Figure 1:
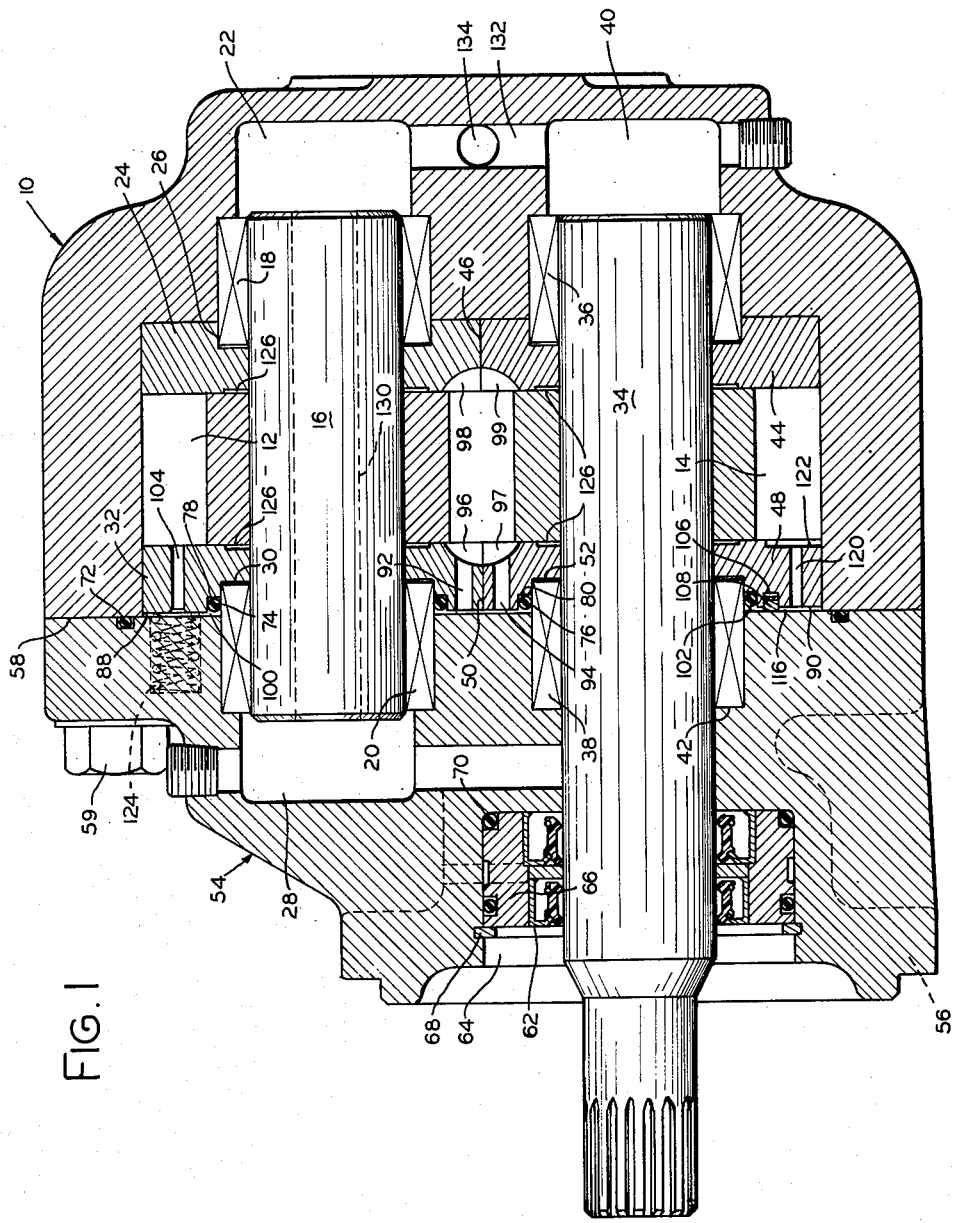
FIGURE 1 is a sectional view of a pressure loaded type, intermeshing gear pump taken along the line 1—1 of FIG. 2 in accordance with one embodiment of the present invention.

Referring now in detail to FIGS. 1–4, numeral 10 denotes a suitably chambered gear pump housing in which are rotatably mounted a driven gear 12 and an intermeshing driving gear 14. Driven gear 12 is supported on a shaft 16 journalled on its right side in a roller bearing 18 and on its left side in a roller bearing 20. Roller bearing 18 is located in a chamber 22 and is maintained in position by a fixed thrust plate 24 located intermediate bearing 18 and gear 12 and providing an annular recess 26 in registry with the left end portion of the bearing. The bearing member 20 is located in a housing chamber 28 and is located in registry with an annular recess portion 30 of an axially movable or floating thrust plate 32 intermediate said bearing and the one side face of gear 12. Driving gear 14 is mounted for rotation upon a drive shaft 34 journalled on its right side in a roller bearing 36 and intermediate its ends in a roller bearing 38, said roller bearings being mounted in chambers 40 and 42, respectively, in a manner similar to the mounting of bearings 18 and 20. A fixed thrust plate 44 is mounted intermediate gear 14 and bearing 36 in a manner similar to the mounting of thrust plate 24, said plates 24 and 44 mating in sealing relationship along complementary flat surfaces thereof indicated at numeral 46. An axially movable or floating thrust plate 48 is mounted intermediate gear 14 and bearing 38 in a manner similar to the mounting of movable thrust plate 32, said movable thrust plates abutting in sealing relationship along complementary flat surfaces thereof as indicated at numeral 50. A recess 52 is formed in thrust plate 48 and receives one end portion of bearing 38. The construction of thrust plates 32 and 48 will be described in greater detail hereinafter.

A cover body 54 having an adapter connecting flange 56 and a mating surface 58 is secured to the pump body 10 by means of a plurality of bolts 59 adapted to be received in threaded openings 60 in pump body 10. Shaft sealing means 62 is located in an enlarged chamber 64 of cover body 54 between a seal retainer member 66, the shaft 34, and a portion of the cover body 54. A snap ring 68 locates seal retainer 66 in chamber 64. A plurality of O-rings are mounted in annular grooves formed in various parts of the pump construction to provide sealing means. The O-ring 70 provides a seal between the retainer member 66 and cover body 54; O-ring 72 provides a seal between the pump body 10 and the cover body 54; O-rings 74 and 76 are located in recesses 78 and 80 of thrust plates 32 and 48, respectively, and provide seals between the thrust plates and bearing members 20 and 42, respectively.

The pump body 10 has an inlet conduit 84 formed in its right side and an outlet conduit 86 formed in its left side. Pressure generated by the gears is communicated from the outlet or discharge side of the pump to rear or motive surfaces 88 and 90 of the thrust plates 32 and 48, respectively, through relatively large openings 92 and 94 in said thrust plates. The passages 92 and 94 open into discharge trapping recesses 96 and 97 on the discharge side of the pump, said recesses being formed in the forward or sealing side surfaces of the thrust plates 32 and 48. Similar trapping recesses 98 and 99 are formed in the sealing side surfaces of fixed thrust plates 24 and 44. These recesses insure continuous communication of openings 92 and 94 with full discharge pressure. The discharge pressure fluid is directed through passage 92 into a pressure chamber 100 which is formed between surface 58 of cover body 54 and the rear surface 88 of thrust plate 32, and is directed through passage 94 into a chamber 102 which is formed between the cover body and the rear surface 90 of thrust plate 48. One or more pressure gradient openings 104, a pair as shown, are located in each of thrust plates 32 and 48 in circumferentially spaced relation to each other and to discharge pressure openings 92 and 94. The pressure gradient openings 104 are located radially outwardly of the root diameter of the gear teeth of gears 12 and 14 so that said openings are adapted to communicate continuously with pressure fluid generated in the gear teeth pockets in the area of each opening 104 for a purpose which will be described more in detail hereinbelow.

A plurality of coil spring members, one of which is shown at numeral 124, may be located in recesses formed in cover body 54 for providing an initial seal between the thrust plates 32 and 48 and the gear side faces. An annular recess 126 is formed inwardly of the root diameter of the sealing surface of each of fixed thrust plates 24 and 44 and movable thrust plates 32 and 48 for the purpose of relieving galling and burning of the metal of the thrust plates and gear side faces in these areas. Pressure fluid which leaks between the gear side faces and the thrust plate sealing surfaces during operation passes along the shafts 16 and 34 through the various bearing members and is collected in chambers 22, 28 and 40 and thence vented back to pump inlet through passageways 130, 132 and 134.

Arcuate and complementary grooves 106 are formed in the motive surfaces of thrust plates 32 and 48 on the inlet sides thereof and are adapted to receive arcuate metallic sealing rings 108 and metallic wave springs 110 for providing an initial seal of the arcuate members 108 with the facing surface of cover body 54. The chambers which are provided in grooves 106 communicate with pressure chambers 100 and 102 by way of pairs of openings 112 and 114 formed in the radially inner walls of grooves 106 so that in operation pressure fluid in chambers 100 and 102 is communicated to the groove chambers beneath arcuate members 108, thereby providing a fluid pressure force which holds the arcuate members in sealing or semi-sealing relation with the cover body and housing bores. Located radially outwardly of grooves 106 in a chamber 116 which is formed between sealing members 108, thrust surfaces 88 and 90 and the opposed cover body surface, is a pair of drain openings 120 which extend through thrust plates 32 and 48 in order to communicate chamber 116 with pump inlet pressure in a pair of chambers 122 which are formed by milling out a section or recess having a predetermined configuration in the sealing surface of the inlet side of each thrust plate. Any pressure fluid in chambers 100 and 102 which flows through sealing members 108 into chamber 116 is vented to inlet pressure in recesses 122 through drain openings 120. Recess 122 of each of thrust plates 32 and 48 provides with the sealing surfaces thereof an edge 140 (FIG. 4) which functions under certain conditions, to be discussed more fully below, as a fulcrum about which each thrust plate may tilt into its respective pressure chamber and away from the gear face whereby to limit the pressure generated at the discharge side of the pump. Each recess 122 is preferably designed to overlap a relatively small portion of discharge pressure responsive surfaces 88 and 90 disposed on the high pressure side of grooves 106, as best seen at numeral 142 in FIG. 4.

In operation, it will be appreciated that the motive pressure chambers 100 and 102 are subjected to a variable pressure which is determined by the relative areas of discharge pressure vented openings 92, 94 and pressure gradient openings 104, and by the characteristic of the pressure gradient which acts on the sealing side of each thrust plate. The force which tends to push each thrust plate 32 and 48 away from the gear side face is equal to the pressure or pressures of fluid between the teeth from the inlet around to the outlet times the area of the sealing surface of each thrust plate which is subjected to this pressure or pressures. Previously, this area has been considered to be the sum of the areas between the teeth. However, I have found that the actual area involved which is subjected to the pressure between the gear teeth is approximately the total annular area from the root of the gear teeth to the outside diameter of each gear. There is a film of oil carried across the side of each tooth which is essentially at the same pressure as the pressure of the fluid between the gear teeth, so that the effective area of the thrust plate on which such pressure acts appears to include the entire aforementioned annular area between the root diameter and the tips of the teeth. I have found no difficulty or problem in respect of surges of pressure adjacent the gradient openings 104 as the gear teeth are rotated past these openings. Under any given pressure gradient condition the pressure in any localized area on the sealing side remains substantially constant as the gear is rotated at a given speed, thus effecting a smooth flow of pressure fluid from discharge vented openings 92 and 94 across the respective thrust plate chambers to and through the various gradient openings 104. If the pump is run under conditions which result in little or no pressure gradient on the high pressure side of sealing member 108, such as during pumping of solid fluid and low r.p.m., a substantially uniform distribution of fluid at or near discharge pressure will exist throughout said area on both sides of each thrust plate and little or no flow of pressure fluid will occur between openings 92, 94 and the gradient openings 104. Pulsations in pressure resulting from the gear teeth rotating past the gradient openings are not readily measurable and have no measurable effect on the accuracy of pressure balance of the plates. An average substantially constant pressure results in localized areas during a given gradient condition because of the rapidity with which the gear teeth pass the gradient openings even at low pump speed, such as 500 r.p.m.

Figure 3:
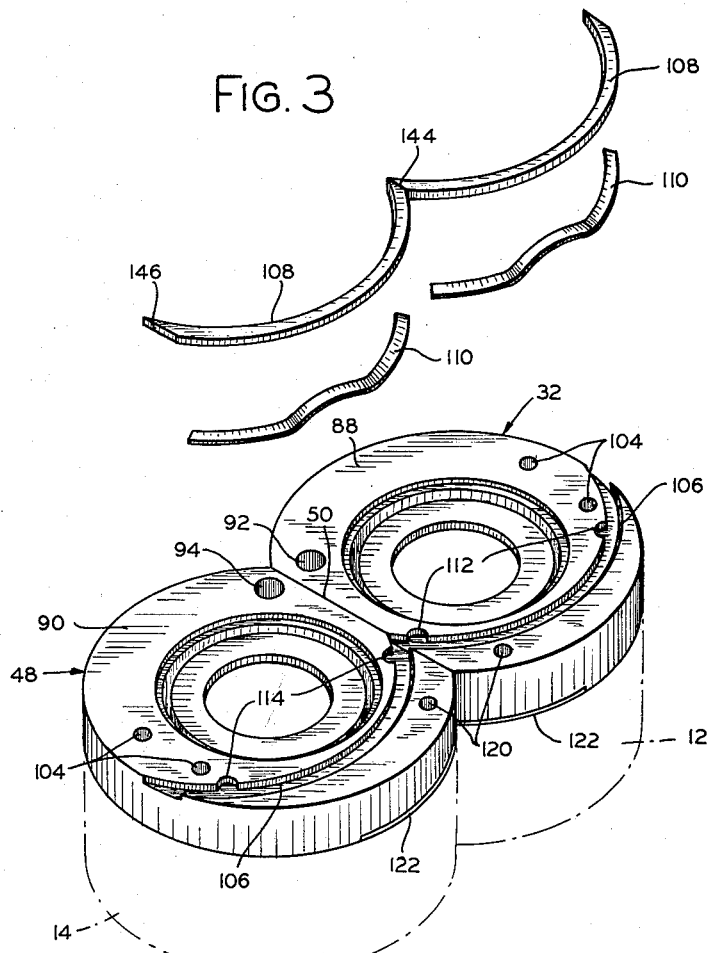
FIGURE 3 is a view in perspective taken from the motive surface side of the thrust plates of FIG. 1 with the gears shown in broken lines and certain parts in exploded relation to the thrust plates.

If the pump speed is increased substantially, a pressure gradient will become apparent in the area on the sealing side of each thrust plate because, as pointed out previously, the fluid under higher r.p.m. operation cannot readily cascade back around the pump between the tips of the gear teeth and the bore of the housing to fill the gear teeth pockets with discharge pressure fluid. Under this condition, as well as under other operating conditions which affect said pressure gradient such as cavitation or an excess of air entrained in the fluid, the pressure with which each gradient opening 104 communicates on the sealing side of each thrust plate will tend to be different than the pressure with which other gradient openings communicate. Streamlines of dynamic pressure fluid therefore flow from the discharge recesses 96 and 97 through openings 92 and 94 and pressure chambers 100 and 102 to each gradient opening 104, and a different pressure drop will occur across each gradient opening depending upon the pressure condition in the area of said opening on the sealing side of the thrust plate. Localized pressure areas around each gradient opening on the motive surface side thereof will therefore approach the pressure in the area surrounding the opposite side of each said opening, whereby a pressure gradient proportional to but somewhat greater than the gradient on the sealing side of each thrust plate is established in chambers 100 and 102 and the thrust plates remain in balance irrespective of changes in the pressure gradient for any reason on the sealing side thereof. By proper selection of the size openings 92, 94 and 104 it will be understood that the net sealing force acting on the thrust plates may be varied as desired. For instance, as the area of opening 92 becomes greater in relation to the area of openings 104 the net sealing force acting to push the thrust plate against the side face of gear 12 will increase. As the pressure under any gradient opening decreases, the quantity of oil flowing to that opening decreases in proportion. The average pressure in chambers 100 and 102 is reduced below the outlet pressure in recesses 96 and 97 by an amount which varies in proportion to the quantity of oil flowing through the gradient openings, or, in other words, the average pressure in chambers 100 and 102 varies in proportion to changes in pressure gradient on the sealing side of the thrust plate. I have obtained extremely satisfactory results in utilizing only two gradient openings located as illustrated in FIGS. 2, 3 and 4, taken in conjunction with the other features of the thrust plate construction above described.

In addition to the pressure gradient flow system described above, sealing members 108 operate in grooves 106 in combination with springs 110 and pressure fluid venting to said grooves through openings 112 and 114, to provide a substantial sealing off of the pressure fluid in chambers 100 and 102 from the fluid in chamber 116 on the low pressure side of said sealing members. Any suitable passage means may be adopted for venting pressure fluid to grooves 106, but I have found the use of semicircular openings 112 and 114 which intersect the one side surface of the grooves to be a simple and effective way of communicating pressure fluid to the grooves. It will be understood that the sealing members 108 tend to seal pressure fluid from chamber 116 both along the surface of cover body 54 which is contacted by the sealing members, along the radially outer surfaces of grooves 106, at abutting surface 144 of the sealing members and at the housing bores contacted by end surfaces 146. If desired the sealing members may be constructed as a unitary member. A complete seal may not be desired for reasons which will become evident hereinbelow, and a certain determinable quantity of pressure fluid leaks past sealing members 108 and is vented to inlet recesses 122 at inlet pressure through drain openings 120. The amount of pressure fluid which enters chamber 116 from chambers 100 and 102 at any given discharge pressure condition will determine the level of pressure in chamber 116 depending upon the inlet pressure condition in recesses 112 and the area of openings 120. For example, in a gear pump generating 2000 p.s.i. discharge pressure, I have found that a pressure of approximately 100 p.s.i. in chamber 116 combined with the other features of the thrust plate construction is satisfactory. Since the pressure in recesses 122 and throughout the area on the sealing side of the thrust plates which corresponds to the configuration of chamber 116 tends to remain at a substantially constant zero gage pressure, it will be understood that use of a higher than zero pressure in chamber 116 effects a sealing of that portion of the thrust plates under chamber 116 which is in contact with the gear side faces. The serious unbalance which would otherwise occur on the inlet side of the thrust plate is therefore alleviated by sealing off discharge pressure fluid from chamber 116 by sealing members 108 and the use of drain openings 120.

Another functional advantage of my invention which has not been previously discussed, although stated as one of the objects of the invention, concerns automatic pressure gradient compensation for pump position. Assume, for example, that a pump in operation is mounted in a vertical position as shown in FIG. 2. In this position, and assuming a substantial amount of air is entrained in the oil being pumped, I have proven by exhaustive tests that a substantially greater amount of such entrained air will tend to pass through the upper gear than will pass through the lower gear. Consequently, the pressure gradient condition will tend to be more pronounced in the upper gear than in the lower gear, and, as a consequence, the pump tends to become unbalanced in operation. My invention inherently compensates for this condition by utilizing an uninterrupted motive pressure chamber so that pressure fluid can flow not only from discharge passages 92 and 94 to upper and lower gradient openings 104, but also from lower gradient openings 104 associated with the gear 14 to upper gradient openings 104 associated with the gear 12. This latter flow pattern tends to maintain the pump in balance and to compensate for variable pressure gradients as between the gears (as well as in each individual gear) regardless of the position of the pump in operation.

My invention also provides bearing load compensation for various pressure gradient conditions encountered during operation. Referring to FIG. 2, I have represented by the letter A the location of the line of juncture between the chamber of the gear 12 and inlet passage 84, by letter B the upper point on the vertical axis of the pump, and by letter C a location displaced 180° from point B. Vector F1 denotes the resultant force which acts radially of the gear 12 towards the inlet of the pump and in a direction substantially parallel thereto, which force is substantially equal to the force obtained by multiplying the projected area of the gear between points B and C times the discharge pressure (under normal operating conditions with the pump operating full of oil). A counteracting force vector F2 acts radially of gear 12 at approximately 45° counterclockwise from the pump inlet and is the resultant of radial forces acting in a direction opposite of the forces having the resultant force F1. Force F2 is substantially equal to the projected area of gear 12 between points B and C times the average or mean pressure between points B and C on the inlet side, which normally increases from 0 p.s.i. gage in the inlet to 2000 p.s.i. at point B in a 2000 p.s.i. discharge pressure pump. The resultant of forces F1 and F2 is known to act radially of the gear in a direction represented by resultant vector R1, which is approximately 30° clockwise from the direction of vector F1, as seen in relation to gear 12, and which comprises the resultant radial load on the bearings 18 and 20, each of which supports one-half of said resultant load. Similarly, a resultant radial load on bearings 36 and 38 associated with gear 14 is represented by vector R2.

As the pressure gradient in the pump increases for any one or combination of causes, as discussed above, force F2 tends to decrease at a faster rate than does force F1, thereby tending to increase resultant R1 which is equal to F1 minus F2, added vectorially. Heretofore, relatively short pump life was the norm in the art as a result of limitations on the size of bearings which could be used in such pumps and relatively high loadings on such bearings under many conditions of pump operation in which serious pressure gradient conditions were encountered. The pressure gradient compensating means of the present invention functions to maintain radial bearing loads within acceptable limits assuring relatively long bearing life in that during operation under conditions tending to produce high bearing loads, as aforesaid, the flow of high pressure fluid from openings 92 and 94 through the motive pressure chambers and gradient openings 104 tends to maintain a relatively high pressure in some of the gear pockets in the inlet portion of the pump between points A and B which in turn tends to maintain a relatively high counteracting force F2.

It has been found that sealing the thrust plates on the side faces of the gears in the area of recesses 122 is unnecessary, and milling out this area has the very desirable result of eliminating contact whereby burning and disintegration of the plates in this area cannot occur. A configuration of milled-out recesses 122 is also designed so that the edge 140 of each recess and the radially inward portion of adjacent sealing member 108 which overlaps recess 122 defines an area 142 on each plate which is subjected to discharge or near discharge pressure in chambers 100 and 102. Under operating conditions wherein there is not too great a pressure gradient in chambers 100 and 102, such as during operaion on solid oil or with relatively little air entrained in the oil, the pressure in chambers 100 and 102 will overbalance any force acting on areas 142 and the portion of chamber 116 which overlaps recesses 122, and the thrust plates will remain in balanced sealing relationship to the side faces of the gears. However, under fairly extreme pressure gradient conditions in the pumping chambers, a corresponding gradient condition exists in chambers 100 and 102 as a result of the operation of gradient openings 104. Discharge or near discharge pressure, however, acts on the unsupported areas 142 of the thrust plates since no pressure gradient openings are in the vicinity to reduce the pressure in such areas. Under such conditions, the pressures in chambers 100, 102 and 116 function in combination to cause thrust plates 32 and 48 to tilt about fulcrum edges 140 such that the sealing surface of each thrust plate is moved away from the adjacent gear side face as the unsupported surfaces of recesses 122 move toward the adjacent gear side faces. In other words, as the pressure gradient holes 104 substantially reduce the pressure in chambers 100 and 102, the force resulting from the pressure differential which acts across the surface area of each thrust plate over each unsupported recess 122 tends to tilt the thrust plate about fulcrum edge 140 which permits the pump to continue to generate the pressure at which the thrust plate tilts, but no greater pressure for so long as the pressure gradient condition exists which caused the plates to tilt. Whenever the pressure gradient condition returns to normal, or the pump again begins to pump oil, the pressure plates will reseat on the gear side faces and permit the generation of full discharge pressure in the pump. Recesses 122 can also be designed to cause the plate to tilt at a specified pressure with the pump running on solid oil. In such a design the pressure plate then functions as a built-in relief valve.

Figure 5:
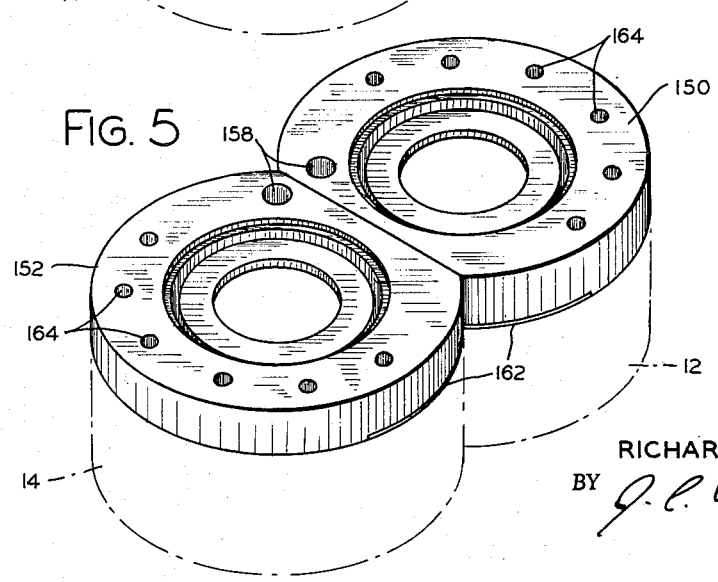
FIGURE 5 is a view similar to FIG. 3 showing a modification of the thrust plate construction.

A simplified embodiment of the thrust plate construction of the present invention is illustrated in FIGS. 5 and 6 which may be substituted in the pump shown in FIGS. 1 and 2 for the thrust plate construction of FIGS. 3 and 4. In this second embodiment of the invention, no pressure compartmentation is provided at the inlet side of the pump by grooves 106 and sealing members 108. The modified thrust plates are identified at numerals 150 and 152; they abut each other along flat complementary surfaces 154 and provide discharge pressure trapping recesses 156 having relatively large openings 158 therethrough similar to the openings 92 and 94 in thrust plates 32 and 48. Recesses 160 in the sealing side of the plates have the same function as recesses 126 in plates 32 and 48. Milled-out recesses 162 formed in the sealing faces on the inlet side may be of a configuration similar to recesses 122 in the previously described thrust plates. A plurality of circumferentially spaced pressure gradient openings 164 extend through the thrust plates radially outwardly of the root diameter of gears 12 and 14 so that these openings communicate continuously during pump operation with the gear teeth pockets, the same as gradient openings 104 in thrust plates 32 and 48. The gradient openings nearest the inlet section of the pump, numbered 164', are preferably located just beyond the portion of the pump on the inlet side which normally operates at inlet pressure. Depending upon the particular characteristics and design of a given gear pump, the pressure gradient openings 164 may be varied in number and area to suit requirements. With a plurality of gradient openings as are provided in plates 150 and 152 it will be appreciated that the complete pressure gradient pattern which may be generated on the sealing side of the thrust plates is reflected in pressure chambers 100 and 102 as a result of the flow pattern between discharge openings 158 and the various gradient openings.

It may be found desirable to vary the area of the gradient openings with respect to each other to provide a more accurate gradient control. For instance, the area of the gradient openings may be increased progressively from the opening nearest the discharge of the pump to the opening nearest the inlet thereof, while utilizing discharge openings 158 which should always be larger than the largest gradient opening. In this manner, the section of the pump which is subjected to the lowest pressures in the gradient, i.e., near the inlet section, is provided with the largest gradient openings for maximum flow from the chambers 100 and 102 to the gear pockets so as to more rapidly transmit these lower pressures to chambers 100 and 102. I have found that utilization of thrust plates of the type shown in either of the embodiments herein disclosed effects a remarkably well-balanced gear pump in a relatively simple manner.

In respect of the operation of the pressure gradient openings in both embodiments disclosed herein, it should be understood that not only do the relative areas of the gradient openings with respect to each other and to the discharge pressure openings affect the accuracy of the balance of the pump, but also the depth of pressure chambers 100 and 102 between the cover body surface and the motive surfaces 88 and 90. As the depth of the pressure chambers is increased, differences in localized pressures in the area of each gradient opening will become less. That is, as the depth of said chambers increases an average pressure will tend to be established throughout the pressure chambers which will vary as the pressure gradient in the gear teeth pocket varies. A relatively small depth pressure chamber, on the other hand, will tend to restrict instantaneous communication of pressures throughout the chambers and different localized pressures will exist in an area surrounding each gradient opening; in each such localized area the pressure will closely approach the gear pocket pressure to which the respective gradient opening is vented.

In a pump utilizing the thrust plates of FIGS. 5 and 6, recesses 162 perform a function similar to recesses 122 in FIGS. 3 and 4. Thrust plates 150 and 152 will tilt about fulcrum edges 166 under conditions of excessive discharge pressure, vacuum or cavitation in the inlet section of the pump, or excessive air passing through the pump; this provides an extremely simple and effective built-in valve means for protecting the pump against destructive operating conditions. The generation of excessive pressure in the discharge of the pump, which is applied to the unsupported ledge above inlet pressure recesses 162, or cavitation in the inlet of the pump creating a vacuum in recesses 162, or excessive air passing through the pump, any one of which conditions if continued will substantially shorten the life of a gear pump, will effect a tilting of each thrust plate about its fulcrum edge 166 as a result of the relatively high differential pressure acting across recess sections 162 as compared with the low differential pressure acting across the remaining areas of the thrust plates. Again, it will be recognized by persons skilled in the art that the particular configuration of recesses 162 may be varied to suit requirements. For example, each recess shown utilizes approximately a 45° angle of the fulcrum edge 166 with mating edge 154 (likewise in the embodiment of FIGS. 3 and 4), and is especially effective under conditions in which excessive air is being passed through the pump. Increasing the angle of the fulcrum edge relative to the mating surface will increase the sensitivity of the thrust plate to adverse operating conditions, inasmuch as the area of the unsupported section above the recess will be thereby increased. Depending upon the operating conditions which a pump is expected to encounter will determine the built-in unloading characteristic for which the pump should be designed.

In FIGS. 7 and 8 I have shown a modification of the thrust plate construction with particular reference to the form of the sealing member and the passage means for venting pressure fluid to the groove in the thrust plate with which the sealing member registers. Parts similar to those described above with respect to FIGS. 3 and 4 have been similarly numbered. In this embodiment groove 106 communicates with trapping recess 96 by way of passage 170 which extends through the thrust plate body as shown. Sealing member 172 is mounted for reciprocation in groove 106 and has a channel-shaped cross-section, as opposed to the flat section sealing member 108 shown in FIG. 3.

In FIG. 9 is shown in enlarged partial section another modification of the form of the sealing member in groove 106 and in relation to the cover body 54. Again, parts similar to those shown in earlier figures have been similarly numbered. In this modification, a sealing member 174 has a basic square or rectangular cross-section with a chamfered lower corner 176 preferably cut at approximately 45°. It has been found that utilization of a sealing member of the configuration of member 174 is particularly well adapted to provide a seal with the surface of the cover body 54 and the arcuate surface of groove 106 adjacent low pressure chamber 116. Chamfered surface 176 provides a third biased surface which with vertical and horizontal surfaces 178 and 180 of member 174 when subjected to pressure in chamber 100 or 102 forces the member into tighter sealing relationship with surface 182 of the groove and the cover body surface, as illustrated in FIG. 9.

Another exemplary modification of the sealing member structure is shown in FIG. 10. In this embodiment the sealing member provides a projection 186 which extends along the arcuate length from the upper surface of the sealing member and on the low pressure side thereof. Member 184, when subjected to pressure fluid in groove 106, forces the arcuate projection 186 into the low pressure chamber 116 formed between the opposed surfaces of the thrust plate and housing cover 54. This provides an even more effective seal, if desired, than the configuration of other above-described embodiments of the sealing member.

From the foregoing, it is believed that those familiar with the art will readily recognize and appreciate the novel concepts and features of the present invention. Obviously, while the invention has been described in relation to only a few embodiments, numerous variations, changes, and substitutions of equivalents will present themselves to persons skilled in the art, and may be made without necessarily departing from the scope and principles of the invention. Also, it will be appreciated that although the invention has been disclosed herein with particular emphasis on its application to intermeshing gear type pumps, that the principles of the invention are as readily applicable to intermeshing gear type motors, and may be applicable to certain vane type pumps and motors and to certain piston type pumps and motors and to other rotary type energy producing or energy translating devices wherein balanced pressure seals of the type herein contemplated may be used to advantage. As a result, it is not my intention to be limited to any particular form of the invention herein illustrated and described except as may appear in the claims appended.

I claim:

1. In a pressure generating pump of the type including a housing containing intermeshing gears and having an inlet leading to and an outlet leading from said housing, an axially movable thrust plate having a sealing surface for sealing the side face of one of asid gears, the side of said thrust plate remote from said sealing surface forming a portion of a motive pressure chamber, passage means conducting pump generated pressure fluid to said pressure chamber for moving said thrust plate axially into sealing engagement with said one gear, and at least one opening in said thrust plate having a smaller flow area than said passage means spaced from said passage means and communicating said passage means and pressure chamber with gear pockets on the sealing side of said thrust plate normally containing a pump generated pressure fluid.

2. In a pump or motor of the type including a housing containing intermeshing gears and having an inlet leading to and an outlet leading from said housing, an axially movable thrust plate having a sealing surface for sealing the side face of one of said gears, the side of said thrust plate opposite said sealing surface forming a portion of a motive pressure chamber, said thrust plate providing passage means communicating a pump generated pressure with said chamber for moving said thrust plate axially into sealing engagement with said one gear, and an opening in said thrust plate in predetermined circumferentially spaced relation from said passage means and radially outwardly of the root diameter of said one gear for communicating pressure fluid flowing into said pressure chamber from said passage means to gear pockets of said one gear which contain normally pump generated fluid, said opening having a smaller flow area than said passage means.

3. In a pump of the type including a housing containing intermeshing gears and having an inlet leading to and an outlet leading from said housing, an axially movable thrust plate having a sealing surface for sealing the side face of at least one of said gears, the side of said thrust plate opposite the sealing surface forming a portion of a motive pressure chamber, a first opening in said thrust plate communicating a pump generated pressure to said chamber for moving said thrust plate axially into sealing engagement with said one gear, a plurality of second openings in said thrust plate located in predetermined spaced relation to each other and to said first opening and spaced radially outwardly of the root diameter of said gear and communicating said pressure chamber with the gear chamber, said second openings being supplied with pressure fluid from said first opening for controlling the pressure in said pressure chamber as a function of variations in pressure in said gear chamber.

4. A pump as claimed in claim 3 wherein the second openings are spaced circumferentially of each other and the second opening nearest the outlet of the pump is of smaller area than the second opening nearest the inlet of the pump.

5. In a pump or motor including a housing chamber containing rotary fluid energy translating elements and high and low pressure areas in said housing chamber, a pressure responsive member having a sealing surface movable into sealing relationship with at least one of said rotary elements, the side of said pressure responsive member remote from said sealing surface forming a portion of a motive pressure chamber, passage means communicating pressure in said high pressure area to said pressure chamber for moving said pressure responsive member into sealing engagement with said one rotary element, and at least one opening communicating said pressure chamber with a circumferential area of said one rotary element and having a flow area bearing a particular predetermined relationship to the flow area of said passage means and to the circumferential location of the opening, said passage means being in communication with said circumferential area of said one rotary element by way of said pressure chamber and said opening, the pressure in said pressure chamber varying as a function of changes in the pressure gradient circumferentially of said rotary element during operation.

6. A pump or motor as claimed in claim 5 wherein said pressure responsive member comprises a rigid floating non-flexible plate member.

7. A pump or motor of the type including a housing having high and low pressure areas and a rotary element for moving pressure fluid from one to the other of said areas, comprising circumferentially spaced projections around the periphery of said rotary element forming fluid containing pockets therebetween, an axially movable thrust member having a sealing surface for abutting one side of said rotary element and the opposite side surface thereof forming with the housing an uninterrupted motive pressure chamber, a plurality of openings in predetermined spaced relation communicating different portions of said pressure chamber with said pockets, and passage means communicating the high pressure area with said pressure chamber for moving said thrust member into sealing engagement with said rotary element, said rotary element producing under different conditions of operation different fluid pressures in said pockets adjacent each of said spaced openings, the pressure differential between said high pressure area and said pockets effecting a flow of pressure fluid from the passage means to said pockets through said uninterrupted pressure chamber and said spaced openings.

8. A pump or motor as claimed in claim 7 wherein each of said openings bears a predetermined flow area relation to the area of said passage means, said opening flow area depending in part upon the location of said opening in relation to the circumferential location of the pockets of the rotary element with which each said opening communicates.

9. A pump or motor as claimed in claim 7 wherein said passage means is of greater flow area than any of said spaced openings.

10. A pump or motor as claimed in claim 7 wherein the spaced opening located nearest the high pressure area is of smaller area than the spaced opening located nearest the low pressure area.

11. A pump or motor as claimed in claim 6 wherein sealing means is located between the housing and said thrust member which separates a low pressure area of the thrust member from said motive pressure chamber, said sealing means including a groove formed in the surface of said thrust member, a sealing element registrable in said groove, and passage means conducting pressure fluid to said groove for actuating said sealing element into abutment with the opposed surface of said housing.

12. In a fluid pump or motor of the type including a housing containing a chamber and an inlet and an outlet to said chamber, a rotary element in said chamber for moving pressure fluid from the inlet to the outlet including circumferentially spaced projections forming fluid containing pockets therebetween, a thrust member having a sealing surface for abutting one side of said rotary element and forming a portion of a motive pressure chamber on the side opposite said sealing surface, a plurality of circumferentially spaced passages communicating said pressure chamber with different ones of said pockets, another passage means communicating substantially outlet pressure fluid with said pressure chamber and with said pockets by way of said circumferentially spaced passages, said rotary element producing under different conditions of operation different pressures adjacent each said circumferentially spaced passage, the pressure differential between said substantially outlet pressure fluid and the pressure fluid in said pockets effecting a flow of pressure fluid between said outlet and said pockets through said pressure chamber and said circumferentially spaced passages for moving said thrust member into sealing engagement with said one side of said rotary element with a force which varies as a function of said latter pressure differential.

13. In a fluid pump or motor including a housing forming a chamber and low and high pressure areas formed in said chamber, a rotary element for moving pressure fluid from one of said areas to the other of said areas including circumferentially spaced projections forming fluid containing pockets therebetween, a movable thrust member having a sealing surface for abutting one side of said rotary element and forming a portion of a motive pressure chamber on the side opposite said sealing surface, at least one substantially fixed area passage means communicating said motive pressure chamber with said pockets as said pockets rotate past said passage means, other passage means communicating said high pressure area with said motive pressure chamber for moving said thrust member into sealing engagement with said one side of said rotary element, said rotary element producing under different conditions of operation different pressures in said pockets as said pockets rotate past said one passage means, the pressure differential between said high pressure area and said pockets adjacent said one passage means effecting a flow of pressure fluid from said high pressure area through said other passage means, said motive pressure chamber, and said one passage means to said pockets adjacent said one passage means.

14. A pump or motor as claimed in claim 13 wherein sealing means is provided for separating a portion of the surface of the thrust member on said opposite side thereof and adjacent the low pressure area from said motive pressure chamber, a recess formed in the sealing surface and adjacent the low pressure area overlapping surface portions of said opposite side of the thrust member which portions are located on opposite sides of said sealing means, and passage means communicating the chamber adjacent said separated surface portion with said recess, said recess providing with said sealing surface a fulcrum such that under certain conditions of operation the thrust member will tilt about said fulcrum to disengage the sealing surface thereof from the one side of said rotary element.

15. A pump or motor as claimed in claim 13 wherein a recess is formed adjacent the low pressure area and on the sealing surface of said thrust member so as to provide a fulcrum edge with said sealing surface about which said thrust member is tiltable to disengage said sealing surface from said one side of said rotary element under certain conditions of operation.

16. In a pressure generating pump of the type including a housing containing a gear and an inlet leading to and an outlet leading from said housing, an axially movable thrust plate having a sealing surface for sealing one side face of said gear, the side of said thrust plate remote from said sealing surface forming with said housing a motive pressure chamber, an opening remote from said outlet for communicating said pressure chamber with fluid pressure pockets formed by said gear, passage means communicating outlet pressure fluid with said pressure chamber for moving said thrust plate into sealing engagement with said one side of said gear, said outlet pressure fluid communicating with said gear pocket through said passage means, said pressure chamber and said opening, and a recess formed in the sealing surface of said thrust plate adjacent the inlet providing with said sealing surface straight edge fulcrum, fluid in said pressure chamber being adapted to tilt the thrust plate about said fulcrum to limit outlet fluid pressure under certain conditions of operation of the pump.

17. A pump as claimed in claim 16 wherein sealing means is provided between said motive surface and said housing adjacent the inlet dividing said motive pressure chamber into two compartments forming high and low pressure chambers, and an opening in said thrust plate communicating the low pressure chamber with said recess.

18. A pump or motor including a housing having low and high pressure ports and a chamber in said housing containing a rotary gear element for communicating fluid between said ports, comprising an axially movable thrust member having a sealing surface engaging in sealing relationship the side face of said rotary element, the opposite side of said thrust element forming a portion of a pressure chamber, a plurality of circumferentially spaced openings remote from the high pressure port for communicating said pressure chamber with said housing chamber, a passage for communicating said high pressure port with said pressure chamber and said spaced openings for moving said thrust plate into sealing engagement with said rotary element, an elongated groove formed in said opposite side of said thrust member adjacent the low pressure port, an elongated sealing element registrable in said groove, and a passageway communicating pressure fluid to said groove for moving said sealing element into abutment with the adjacent surface of said housing.

19. A pump or motor as claimed in claim 18 wherein a recess is formed in the sealing surface of said thrust member in overlapping relation to portions of said opposite side of the thrust member which are disposed on opposite sides of said groove.

20. A pump or motor as claimed in claim 18 wherein said circumferentially spaced openings increase in area from the opening nearest the high pressure port to the opening nearest the low pressure port, said passage having an area greater than the area of the largest spaced opening.

21. A pump or motor as claimed in claim 18 wherein said sealing element is non-resilient and is so constructed and arranged that a determinable quantity of pressure fluid flows through said sealing element from said pressure chamber, and a second passageway communicating said determinable fluid quantity to said low pressure port.

22. A pump or motor including a housing having high and low pressure ports, a chamber and a rotary element in said chamber, comprising an axially movable thrust plate having a sealing surface engageable in sealing relationship with the side face of said rotary element, the side of said thrust plate remote from said sealing surface forming a pressure chamber with said housing, a recess of predetermined configuration formed in the sealing surface adjacent the low pressure port and forming with said sealing surface a substantially straight biased fulcrum edge about which the thrust plate is adapted to pivot, and means communicating high pressure fluid to said pressure chamber, said fluid pressure in said pressure chamber acting on the unsupported ledge formed by the remote surface portion of said thrust plate which overlaps said recess to cause said thrust plate to tilt about said fulcrum edge when said pressure chamber is subject to a relatively high pressure gradient whereby to move said sealing surface out of sealing relation with the side face of said rotary element.

23. A pump or motor as claimed in claim 22 wherein sealing means is provided in said pressure chamber for dividing said pressure chamber into high and low pressure portions, said recess overlapping portions of both said high and low pressure portions.

24. A pump or motor as claimed in claim 23 wherein said sealing means includes a sealing element registrable with a portion of the thrust plate surface in said pressure chamber and adapted to permit a determinable quantity of pressure fluid to flow between said high and low pressure portions, and passage means communicating said low pressure portion with said recess.

25. As an article of manufacture, a thrust plate for use with pumps and motors comprising a substantially annular member, a sealing surface on one side of said member, a flat motive surface on the opposite side of said member, a groove extending across said motive surface, circumferentially spaced openings formed in the outer peripheral portion of said thrust plate and extending through said surfaces, and a recess formed in the sealing surface and providing therewith a substantially straight biased fulcrum edge, one of said openings extending into said recess.

26. In a pump or motor including a housing chamber containing rotary fluid energy translating elements and high and low pressure areas in said housing chamber, a pressure responsive member having a sealing surface movable into sealing relationship with at least one of said rotary elements, the side of said pressure responsive member remote from said sealing surface forming a portion of a motive pressure chamber, substantially fixed area passage means communicating pressure in said high pressure area to said pressure chamber for moving said pressure responsive member into sealing engagement with said one rotary element, and at least one substantially fixed area opening communicating said pressure chamber with a circumferential area of said one rotary element in which latter area fluid pressure is generated by the rotary element, said passage means being in communication with said circumferential area of said one rotary element by way of said pressure chamber and said opening, the pressure in said pressure chamber varying continuously as a function of changes in pressure in said circumferential area of said rotary element during operation.

27. In a pump or motor including a housing chamber containing rotary fluid energy translating elements and high and low pressure areas in said housing chamber, a pressure responsive member having a sealing surface movable into sealing relationship with at least one of said rotary elements, the side of said pressure responsive member remote from said sealing surface forming a portion of a motive pressure chamber, passage means communicating pressure in said high pressure area to said pressure chamber for moving said pressure responsive member into sealing engagement with said one rotary element, and at least one opening communicating said pressure chamber with a predetermined circumferential area of said one rotary element, and in which said rotary element generates fluid pressure, said passage means being in communication with said circumferential area of said one rotary element by way of said pressure chamber and said opening, the flow area and circumferential location of said opening bearing a predetermined relationship to the flow area of said passage means and to the circumference of said one rotary element so as to vary the pressure in said motive pressure chamber as a function of changing pressure conditions in said circumferential area of said rotary element.

28. In a pump or motor including a housing chamber containing intermeshing rotary fluid energy translating elements having circumferentially spaced projections peripherally thereof forming fluid containing pockets therebetween and high and low pressure areas in said housing chamber, a pressure responsive means having a sealing surface movable into sealing relationship with one side of each of said rotary elements, the side of said pressure responsive means remote from said sealing surface forming with the housing an uninterrupted motive pressure chamber, passage means communicating pressure in said high pressure area to said pressure chamber for moving said pressure responsive means into sealing engagement with said rotary elements, and at least one opening communicating said pressure chamber with a predetermined circumferential pocket portion of each of said rotary elements in which said rotary elements generate fluid pressure, the pressure differential between said high pressure area and said pocket portions adjacent each of said openings effecting a flow of pressure fluid from the passage means to said pocket portions through said uninterrupted pressure chamber and said openings.

29. A pump or motor as claimed in claim 28 wherein at least two of said openings are located in predetermined spaced relation to circumferential pocket portions of each of said rotary elements, the pressure, volume and direction of flow of pressure fluid in said uninterrupted pressure chamber varying as a function of the pressure gradient condition circumferentially of each of said rotary elements and as between said rotary elements.

30. A pump or motor as claimed in claim 28 wherein each of said openings bears a predetermined area relationship to said passage means and is in a predetermined circumferential location in relation to the housing chamber, the pressure, volume and direction of fluid flow in said uninterrupted pressure chamber being variable as a function of pressure variations in said pocket portions adjacent said openings.

31. A pump as claimed in claim 28 wherein bearing means supports said rotary elements for rotation, said bearing means being subjected to resultant fluid pressure forces directed radially of the rotary elements on the discharge pressure side of the vertical axis of the rotary elements, said openings communicating pressure fluid in said uninterrupted pressure chamber with the pockets of said rotary elements at a location on the inlet side of the vertical axis of said rotary elements, whereby to effect forces on said bearings which tend to counteract said resultant bearing forces.

32. In a gear pump including a housing chamber containing intermeshing gears, bearing means supporting said gears for rotation and high and low pressure areas on the outlet and inlet sides of the gears, respectively, a thrust plate means movable into sealing relationship with one side of said gears, the side of said thrust plate means remote from said sealing side forming with the housing a motive pressure chamber means, passage means communicating pressure in said high pressure area to said pressure chamber for moving said thrust plate means into sealing engagement with said gears, at least one opening communicating said pressure chamber with a predetermined circumferential pocket portion of each of said gears, the pressure differential between said high pressure area and said pocket portions effecting a flow of pressure fluid from the passage means to said pocket portions through said pressure chamber means and said openings, each of said openings into said pocket portions being located towards the low pressure side of the pump in relation to the vertical axis of the associated gear so that the flow of pressure fluid from the passage means and pressure chamber means through each of said openings produces a radially directed force on said bearing means which acts in opposition to a radially directed resultant force on said bearing means on the high pressure side of the vertical axis of the gears.

33. In a pump or motor of the type including a housing containing intermeshing gears and having an inlet leading to and an outlet leading from said housing, axially movable thrust plate means having a sealing surface for sealing the side face of one said gears, the side of said thrust plate opposite said sealing surface forming a portion of a motive pressure chamber, passage means communicating a pump generated pressure to said chamber for moving said thrust plate axially into sealing engagement with said one gear, and a pair of openings located in spaced relation to each other and in predetermined circumferentially spaced relation to said passage means and radially outwardly of the root diameter of said one gear for communicating pressure fluid flowing into said pressure chamber from said passage means to gear pockets of said one gear which contains normally fluid at a pump generated pressure, said pair of openings being located on opposite sides of the vertical axis of said one gear and each having a flow area no larger than the flow area of said passage means.

References Cited in the file of this patent

UNITED STATES PATENTS

| | | |
|---|---|---|
| 2,513,984 | Witchger | July 4, 1950 |
| 2,714,856 | Kane | Aug. 9, 1955 |
| 2,809,592 | Miller et al. | Oct. 15, 1957 |
| 2,816,512 | Murray | Dec. 17, 1957 |
| 2,853,952 | Aspelin | Sept. 30, 1958 |
| 2,870,719 | Murray et al. | Jan. 27, 1959 |
| 2,870,720 | Lorenz | Jan. 27, 1959 |
| 2,876,705 | Aspelin et al. | Mar. 10, 1959 |
| 3,011,448 | Oliver | Dec. 5, 1961 |
| 3,012,511 | Adams | Dec. 12, 1961 |
| 3,046,902 | Lauck et al. | July 31, 1962 |
| 3,076,414 | Adams | Feb. 5, 1963 |

FOREIGN PATENTS

| | | |
|---|---|---|
| 1,121,180 | France | Apr. 30, 1956 |
| 769,763 | Great Britain | Mar. 13, 1957 |